United States Patent
Liu et al.

(10) Patent No.: US 12,476,727 B2
(45) Date of Patent: Nov. 18, 2025

(54) METHOD FOR DISSEMINATING SCALING INFORMATION AND APPLICATION THEREOF IN VLSI IMPLEMENTATION OF FIXED-POINT FFT

(71) Applicants: IMEC VZW, Leuven (BE); ShanghaiTech University, Shanghai (CN)

(72) Inventors: Xinzhe Liu, Shanghai (CN); Raees Kizhakkumkara Muhamad, Uccle (BE); Dessislava Nikolova, Borsbeek (BE); Yajun Ha, Shanghai (CN); Francky Catthoor, Temse (BE); Fupeng Chen, Shanghai (CN); Peter Schelkens, Willebroek (BE); David Blinder, Antwerp (BE)

(73) Assignees: Imec vzw, Leuven (BE); ShanghaiTech University, Shanghai (CN)

(*) Notice: Subject to any disclaimer, the term of this patent is extended or adjusted under 35 U.S.C. 154(b) by 376 days.

(21) Appl. No.: 18/049,932

(22) Filed: Oct. 26, 2022

(65) Prior Publication Data
US 2023/0179315 A1 Jun. 8, 2023

(30) Foreign Application Priority Data
Dec. 2, 2021 (CN) .......................... 202111460635.6

(51) Int. Cl.
*H04J 11/00* (2006.01)
(52) U.S. Cl.
CPC .................... *H04J 11/00* (2013.01)
(58) Field of Classification Search
CPC ....................................................... H04J 11/00
See application file for complete search history.

(56) References Cited

U.S. PATENT DOCUMENTS

2006/0010188 A1* 1/2006 Solomon .......... H03M 13/4107
708/400

OTHER PUBLICATIONS

Liu, Xinzhe, Fupeng Chen, Raees Kizhakkumkara Muhamad, David Blinder, Dessislava Nikolova, Peter Schelkens, Francky Catthoor, and Yajun Ha. "Bitwidth-Optimized Energy-Efficient FFT Design via Scaling Information Propagation." In 2021 58th ACM/IEEE Design Automation Conference (DAC), pp. 613-618. IEEE, 2021.

(Continued)

*Primary Examiner* — Duc C Ho
(74) *Attorney, Agent, or Firm* — McDonnell Boehnen Hulbert & Berghoff LLP

(57) ABSTRACT

Example embodiments relate to methods for disseminating scaling information and applications thereof in very large scale integration (VLSI) implementations of fixed-point fast Fourier transforms (FFTs). One embodiment includes a method for disseminating scaling information in a system. The system includes a linear decomposable transformation process and an inverse process of the linear decomposable transformation process. The inverse process of the linear decomposable transformation process is defined, in time or space, as an inverse linear decomposable transformation process. The linear decomposable transformation process is separated from the inverse linear decomposable transformation process. The linear decomposable transformation process or the inverse linear decomposable transformation process is able to be performed first and is defined as a linear decomposable transformation I. The other remaining process is performed subsequently and is defined as a linear decomposable transformation II. The method for disseminating scaling information is used for a bit width-optimized and energy-saving hardware implementation.

12 Claims, 4 Drawing Sheets

(56) References Cited

OTHER PUBLICATIONS

He, Shousheng, and Mats Torkelson. "Designing pipeline FFT processor for OFDM (de) modulation." In 1998 URSI International Symposium on Signals, Systems, and Electronics. Conference Proceedings (Cat. No. 98EX167), pp. 257-262. IEEE, 1998.

Muhamad, Raees Kizhakkumkara, David Blinder, Athanasia Symeonidou, Tobias Birnbaum, Osamu Watanabe, Colas Schretter, and Peter Schelkens. "Exact global motion compensation for holographic video compression." Applied Optics 58, No. 34 (2019): G204-G217.

Clark, Martin, Mike Mulligan, Dave Jackson, and Darel Linebarger. "Accelerating fixed-point design for MB-OFDM UWB systems." CommsDesign, Jan. 4, 2005.

Chan, Shing-Chow, and Kai Man Tsui. "Wordlength optimization of linear time-invariant systems with multiple outputs using geometric programming." IEEE Transactions on Circuits and Systems I: Regular Papers 54, No. 4 (2007): 845-854.

Fiore, Paul D. "Efficient approximate wordlength optimization." IEEE Transactions on Computers 57, No. 11 (2008): 1561-1570.

Cantin, M-A., Yvon Savaria, D. Prodanos, and Pierre Lavoie. "An automatic word length determination method." In ISCAS 2001. The 2001 IEEE International Symposium on Circuits and Systems (Cat. No. 01CH37196), vol. 5, pp. 53-56. IEEE, 2001.

Constantinides, George A., Peter YK Cheung, and Wayne Luk. "Wordlength optimization for linear digital signal processing." IEEE Transactions on Computer-Aided Design of Integrated Circuits and Systems 22, No. 10 (2003): 1432-1442.

Han, Kyungtae, Iksu Eo, Kyungsu Kim, and Hanjin Cho. "Numerical word-length optimization for CDMA demodulator." In ISCAS 2001. The 2001 IEEE International Symposium on Circuits and Systems (Cat. No. 01CH37196), vol. 4, pp. 290-293. IEEE, 2001.

Lee, D-U., Altaf Abdul Gaffar, Ray CC Cheung, Oskar Mencer, Wayne Luk, and George A. Constantinides. "Accuracy-guaranteed bit-width optimization." IEEE Transactions on Computer-Aided Design of Integrated Circuits and Systems 25, No. 10 (2006): 1990-2000.

Nguyen, H-N., Daniel Menard, and Olivier Sentieys. "Novel algorithms for word-length optimization." In 2011 19th European Signal Processing Conference, pp. 1944-1948. IEEE, 2011.

Ganjikunta, Ganesh Kumar, and Subhendu Kumar Sahoo. "An area-efficient and low-power 64-point pipeline Fast Fourier Transform for OFDM applications." Integration 57 (2017): 125-131.

Mahdavi, Hossein, and Somayeh Timarchi. "Area-time-power efficient FFT architectures based on binary-signed-digit CORDIC." IEEE Transactions on Circuits and Systems I: Regular Papers 66, No. 10 (2019): 3874-3881.

Mohanty, Basant K., and Pramod Kumar Meher. "Area-delay-energy efficient vlsi architecture for scalable in-place computation of fft on real data." IEEE Transactions on Circuits and Systems I: Regular Papers 66, No. 3 (2018): 1042-1050.

Chang, Wei-Hsin, and Truong Q. Nguyen. "On the fixed-point accuracy analysis of FFT algorithms." IEEE Transactions on Signal Processing 56, No. 10 (2008): 4673-4682.

Milder, Peter, Franz Franchetti, James C. Hoe, and Markus Püschel. "Computer generation of hardware for linear digital signal processing transforms." ACM Transactions on Design Automation of Electronic Systems (TODAES) 17, No. 2 (2012): 1-33.

Koutsoyannis, Robert, Peter A. Milder, Christian R. Berger, Madeleine Glick, James C. Hoe, and Markus Püschel. "Improving fixed-point accuracy of FFT cores in O-OFDM systems." In 2012 IEEE International Conference on Acoustics, Speech and Signal Processing (ICASSP), pp. 1585-1588. IEEE, 2012.

Welch, P. "A fixed-point fast Fourier transform error analysis." IEEE Transactions on Audio and Electroacoustics 17, No. 2 (1969): 151-157.

* cited by examiner

METHOD FOR DISSEMINATING SCALING INFORMATION AND APPLICATION THEREOF IN VLSI IMPLEMENTATION OF FIXED-POINT FFT

CROSS-REFERENCE TO RELATED APPLICATIONS

The present application is a non-provisional patent application claiming priority to Chinese Patent Application No. 202111460635.6, filed Dec. 3, 2021, the contents of which are hereby incorporated by reference.

FIELD OF THE DISCLOSURE

The present disclosure relates to a method for disseminating scaling information and application of the method for disseminating scaling information in very large scale integration (VLSI) implementation of fixed-point fast Fourier transform (FFT).

BACKGROUND

FFT, one of the most important algorithms in digital signal processing (DSP), can accelerate discrete Fourier transform (DFT) and effectively process discrete signals. FFT, based on its relatively low computational complexity, has been widely used in wireless communication systems and compression systems. We note that there are applications with the following two features:
  1. FFT occurs in pairs with inverse fast Fourier transform (IFFT). For example, FFT is performed first, and then IFFT is performed on the obtained result, or vice versa.
  2. The two transforms are separated in time or space. The transform performed first is more loosely constrained.

In these scenarios, FFT and IFFT occur in pairs and are executed one after another, which brings data dependencies. Successive conversions face different constraints, i.e. in the asymmetric case, this allows us to reallocate the computational costs and optimize hardware circuits by using data dependencies. For example, in the wireless communication system based on an orthogonal frequency division multiplexing (OFDM), a sender performing IFFT and a receiver performing FFT are separated in space. The sender is typically ground equipment connected to a power source, so the system can be designed to withstand higher power consumption and cover a larger area. On the other hand, the receiver is typically lightweight mobile equipment, which exerts severe constraints on power consumption and resource consumption in design. We can perform more calculations on the sending part to simplify the hardware implementation in the receiving part. Another example is a holographic video compression (HVC) system. FFT encoding and IFFT decoding are separated in time and can tolerate the time overhead in the encoding operation, but the decoding operation requires careful processing. Therefore, it is feasible to perform more computations in the encoding part to optimize decoding.

Recently, approximate calculation (AC) has been considered as a solution to solve the energy efficiency problem. One of the popular AC techniques is to use fixed-point algorithms for low-precision calculations in digital signal processing or machine learning systems. This technique always requires conversion from a floating point to a fixed point to optimize the fixed point word length so as to achieve a balance between cost and quality requirements. This process is referred to as word length optimization (WLO) and accounts for 25-50% of the design time. Methods to solve the WLO problem can be divided into two categories: analytical methods and simulation-based methods. The analytical method is directed to the convexity-relaxed WLO problem, and then some convex optimization algorithms are applied to directly obtain the best solutions. Although WLO can be processed quickly, these methods require to model the precision as a convex function, however, the convex function usually cannot be constructed by analysis. The simulation-based method solves the WLO problem by using the iterative search simulating.

To achieve higher performance, there have been extensive studies on VLSI implementation of fixed-point FFT. It should be noted that the problem of dynamic range growth comes with the fixed-point FFT that uses a fixed bit width to represent data values. In the most common fixed-point hardware design, either the bit width is increased by one bit after each stage, or all the data are shifted to the right by one bit (scaled by ½ scale). The average size of the data increases by $\sqrt{2}$ as the data passes through each stage. Based on this, increasing the bit width at each stage will cause a serious waste of resources, and shifting all the data to the right by one bit at each stage will bring a huge loss of accuracy. Other self-adaptive scaling methods (e.g., block floating point number) can greatly improve accuracy and avoid unnecessary truncation by determining whether scaling is required at each stage. However, the quality of the output signal depends on the block size and characteristics of the input signal. This will also incur the non-negligible hardware cost, especially for pipelined FFT architectures, as it is difficult to solve the problem of data dependencies and the data storage/buffer zone is high in cost. For parsing-based solutions, high conservativeness and long run time are issues that cannot be ignored. In these methods, substantial time is consumed at the design stage. In addition, they cannot fully consider the characteristics of the data to be processed, so they choose a conservative bit width.

SUMMARY

The present disclosure provides an effective scaling method to mitigate the problem of dynamic range growth.

As such, the present disclosure provides a method for disseminating scaling information in a system, the system simultaneously including a linear decomposable transformation process and an inverse process of the linear decomposable transformation process, and the inverse process of the linear decomposable transformation process being defined as an inverse linear decomposable transformation process; in time or space, the linear decomposable transformation process being separated from the inverse linear decomposable transformation process, then any one of the linear decomposable transformation process or the inverse linear decomposable transformation process being able to be performed first, and then the other remaining process being performed subsequently; further the linear decomposable transformation process or the inverse linear decomposable transformation process performed first being defined as a linear decomposable transformation I, and the inverse decomposable transformation process or the linear decomposable transformation process performed later being defined as a linear decomposable transformation II; the method for disseminating scaling information being used for bit width-optimized and energy-saving hardware implementation of linear decomposable transformation in DSP, which includes the following steps:

in a system design stage:
    negating an operation at each stage of the linear decomposable transformation II as an operation at a corresponding stage of the linear decomposable transformation I;
    designing a bit width for each stage of the linear decomposable transformation II; and
    inserting a scaling information collection module and a scaling decision-making module in the linear decomposable transformation I and inserting a multiplexer in the linear decomposable transformation II; and in a system run stage:
    during running of the linear decomposable transformation I, collecting and calculating, by the scaling information collection module, a bit width and saturation cost that may be required for each stage of the linear decomposable transformation II; determining, by the scaling decision-making module based on the bit width and saturation cost required for each stage, whether scaling is required to obtain a best scaling strategy, which includes the following steps:
        if the bit width required at the current stage is smaller than a pre-designed bit width, determining, by the scaling decision-making module, that scaling is not required at the current stage; if the bit width required at the current stage is larger than the pre-designed bit width, further determining whether the saturation cost is greater than a fixed value hyperparameter n, a quantization error being appointed as the fixed value hyperparameter n; if the saturation cost is less than the fixed value hyperparameter n, determining, by the scaling decision-making module, that scaling is not required at the current stage; and if the saturation cost is greater than the fixed value hyperparameter n, then determining, by the scaling decision-making module, that scaling is required at the current stage.

A scaling decision output by the scaling decision-making module is performed by the multiplexer at each stage when the linear decomposable transformation II runs.

In some embodiments, in the system design stage, when a bit width is designed for each stage of the linear decomposable transformation II, the selected bit width is minimized as much as possible while ensuring that a saturation error is less than n.

In some embodiments, the scaling decision-making module expresses the scaling decision as a series of bit sequences with the bit width same as the number of stages, if the linear decomposable transformation I and the linear decomposable transformation II have M stages in total, then a length of the bit sequence is M, and a value of the $m^{th}$ bit element in the bit sequence is 0 or 1, representing that scaling is not required or scaling is required, m=1, 2, ..., M.

In some embodiments, a data block is composed of a plurality of input data sequences, the whole data block shares the same scaling decision, and by adjusting the size of the data block, denser and more optimized scale decisions can be obtained, or sparse and more conservative scale decisions can be obtained.

In some embodiments, the linear decomposable transformation I is adjacent to the linear decomposable transformation II, or other symmetric data processing components are inserted between the linear decomposable transformation I and the linear decomposable transformation II.

Some embodiments also provide application of the above-mentioned method for disseminating scaling information in a system in VLSI implementation of fixed-point FFT, characterized in that the linear decomposable transformation process is fast Fourier transform, the inverse linear decomposable transformation process is inverse fast Fourier transform, then the linear decomposable transformation I is fast Fourier transform or inverse fast Fourier transform performed first, and the linear decomposable transformation II is inverse fast Fourier transform or fast Fourier transform performed later;
    when a bit width is designed for each stage of the linear decomposable transformation II, the bit width is a bit width expected in VLSI design; and
    when the linear decomposable transformation II runs, at each stage, on a VLSI architecture of the linear decomposable transformation II, a scaling decision output by a scaling decision-making module is executed by the multiplexer, so that the scaling decision output by the scaling decision-making module serves fixed-point VLSI implementation of the linear decomposable transformation II.

If the system that some embodiments pay attention to may contain any pair of linear transformations including both FFT and IFFT, scaling methods popular at current only focus on the current FFT or IFFT to alleviate the problem of dynamic range growth, which brings more decision burden. For example, a block floating point places collecting scaling information and making and using scaling decisions in the same transformation, which incurs more resource overhead. The fact that FFT and IFFT are inverse transformations of each other has prompted us to explore the possibility of adopting the scaling strategy in the previous transformation and performing it in the subsequent transformation. The present disclosure describes a scaling framework, and the framework obtains the scaling decisions in the previous transformation and performs them in the subsequent transformation. It should be noted that under the scaling framework proposed by the present disclosure, any scaling strategy can be seamlessly integrated, e.g. ensuring that the number of missing bits does not exceed m, or ensuring that the total saturation errors at the current stage do not exceed n. The framework provided by the present disclosure decouples extracting the scaling information and making the scaling decision, thereby bringing more design space to explore scaling strategies.

The present disclosure can save energy and area consumed by linear decomposable transformation operations such as FFT and buffer zones, while only adding a negligible area in additional scaling factor implementation.

DETAILED DESCRIPTION

Figure 1:
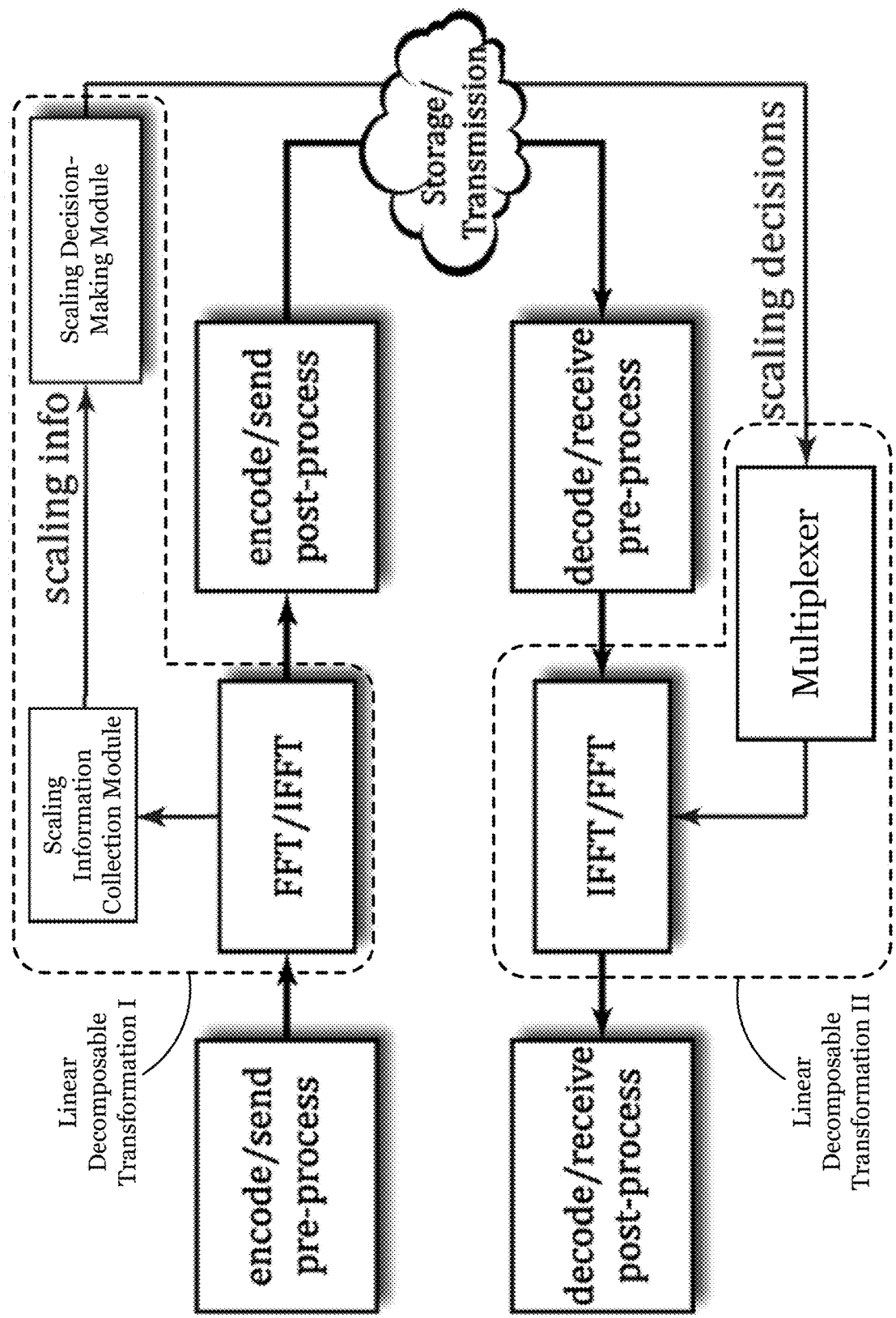
FIG. 1 is an overall flowchart, according to example embodiments.

The present disclosure will be further described with reference to specific embodiments. It should be understood that these embodiments are only used to illustrate and are not intended to limit the scope of the present disclosure. In addition, it should be understood that, after reading the teaching of the present disclosure, a person skilled in the art can make various changes or modifications to the present disclosure, and these equivalent forms also fall within the scope defined by the appended claims of this application.

The problem of dynamic range growth is accompanied by fixed-point FFT that uses a fixed bit width to represent data values. The problem of information loss caused by the dynamic range growth at each stage of the fixed-point FFT operation stems from the following two main sources of error.

Quantization error: An error caused by insufficient precision of the fixed point number containing input data and a twiddle factor is referred to as a quantization error. In addition, the loss of precision caused by the right shift operation during computation is also referred to as the quantization error. At a given bit width, it may be difficult to reduce the error caused by the bit width limitation of the input data and the twiddle factor, but the error caused by the right shift operation can be optimized by performing right shift only when needed.

Saturation error: In FFT, addition, subtraction, and multiplication operations may require the use of more bit widths to store results to ensure that precision is not lost. These operations may include truncation (or saturation) of the acquired data to limit resource consumption within a controllable range, which may lead to overflow. In other words, if saved data goes beyond the range that can be represented by the given bit width, overflow will occur. Solutions for overflow can be divided into truncation and saturation, respectively. The former discards the highest bit and causes devastating consequences, while the latter rounds to a specific value and causes limited losses. In some embodiments, we may only use saturation operations since the catastrophic consequences of truncation are unacceptable. Therefore, we refer to the error caused by the overflow as the saturation error.

Most of the scaling methods popular at current attempt to avoid any overflow by a right shift operation. It should be noted that right shift can eliminate overflow, but inevitably loses the last bit, resulting in more quantization errors. Thus, in this work, some embodiments may propose a specific algorithm to extract the scaling information and make a scaling decision for scaling information propagation (SIP) so that the saturation errors and the quantization errors can be balanced. Some embodiments may use saturation and shift operations to handle the problem of possible overflow. The saturation operation will replace an original value with the maximum value represented by the currently used bit width, which will result in the saturation error. The right shift operation loses the last bit, which will result in the quantization error. Some embodiments may make a scaling decision at each stage of the linear decomposable transformation process to determine which overflow is tolerable (saturation operation) and which overflow might be avoided (right shift operation).

A system that example embodiments pay attention to may include both a linear decomposable transformation process and an inverse process of the linear decomposable transformation process. The inverse process of the linear decomposable transformation process is defined as an inverse linear decomposable transformation process. The linear decomposable transformation process is separated from the inverse linear decomposable transformation process in time or space. Any one of the linear decomposable transformation process or the inverse linear decomposable transformation process can be performed first, and then the other remaining process is performed subsequently. In some embodiments, further, the linear decomposable transformation process or the inverse linear decomposable transformation process performed first is defined as a linear decomposable transformation I, and the inverse linear decomposable transformation process or the linear decomposable transformation process performed later is defined as a linear decomposable transformation II.

Based on the above definition, some embodiments provide a method for disseminating scaling information in a system. The method is used for bit width-optimized and energy-saving hardware implementation of linear decomposable transformation in DSP, and includes the following steps.

In a system design stage:
An operation at each stage of the linear decomposable transformation II is negated as an operation at each stage of the linear decomposable transformation I. Since the linear decomposable transformation I and the linear decomposable transformation II are linear, this step allows us to directly observe all data of each stage of the linear decomposable transformation II from the operation of the linear decomposable transformation I, collect scaling information therefrom, and make scaling decisions according to strategies in the corresponding stage to serve the linear decomposable transformation II.

A bit width is designed for each stage of the linear decomposable transformation II. The selected bit width is minimized as much as possible while ensuring that the saturation error is less than n. The quantization error is appointed as a fixed value hyperparameter n. In this embodiment, a bit width is selected for each stage (to store an operation result).

A scaling information collection module and a scaling decision-making module are inserted in the linear decomposable transformation I. A multiplexer is inserted in the linear decomposable transformation II.

In a system run stage:
During running of the linear decomposable transformation I, a bit width and saturation cost that may be required for each stage of the linear decomposable transformation II are collected and calculated by the scaling information collection module. Whether scaling is required is determined by the scaling decision-making module based on the bit width and saturation cost required for each stage to obtain the best scaling strategy, which includes the following steps.

If the bit width required at the current stage is smaller than a pre-designed bit width, it is determined by the scaling decision-making module that scaling is not required at the current stage. If the bit width required at the current stage is larger than the pre-designed bit width, it is further determined whether the saturation cost is greater than a fixed value hyperparameter n. If the saturation cost is less than the fixed value hyperparameter n, it is determined by the scaling decision-making module that scaling is not required at the current stage. If the saturation cost is greater than the fixed value hyperparameter n, then it is determined by the scaling decision-making module that scaling is required at the current stage.

The scaling decision-making module expresses the scaling decision as a series of bit sequences with the bit width same as the number of stages. If the linear decomposable transformation I and the linear decomposable transformation II have M stages in total, then a length of the bit sequence is M. A value of the $m^{th}$ bit element in the bit sequence is 0 or 1. If it is 1, it represents that scaling is required (right shift operation). If it is 0, it represents that scaling is not required (saturation operation). m=1, 2, . . . , M. This series of bit sequences will be stored or transmitted with the data itself to direct the operation of the linear decomposable transformation II.

A scaling decision output by the scaling decision-making module is performed by the multiplexer at each stage when the linear decomposable transformation II runs.

The decomposable transformation process and the inverse decomposable transformation process may be any linear transformation including FFT and IFFT. In some embodiments, the scaling information may be extracted from the previous transformation according to the linear relationship between the transformation and the inverse transformation. The scaling information is passed on to the subsequent transformation for use, thereby enabling a shift in computational complexity. It should be noted that two successive transformations do not need to be adjacent, and other additional data processing components may be inserted between the two transformations as long as the inserted components are symmetrical. Extended information is integrated into subsequent remolding to achieve resource and energy efficiency higher than that of other alternatives.

In the following, example embodiments are further explained by taking the example of applying the above-mentioned method for disseminating scaling information in the system to VLSI implementation of fixed-point FFT.

If FFT is performed first, then IFFT is performed. By the method provided in the present disclosure, by negating an operation at each stage in the IFFT process as an operation at each stage of FFT, this allows us to directly observe all the data of each stage of IFFT from the previous FFT operation, collect scaling information therefrom, and make scaling decisions according to the strategies in the corresponding stage to serve fixed-point VLSI implementation in the subsequent IFFT process. In the run stage, a scaling strategy may be performed by the multiplexer on a VLSI architecture of the subsequent linear decomposable transformation process.

Since the quantization error depends on the lowest bit of each data bit sequence, which is very easily overwhelmed by noise, some embodiments may not estimate the quantization error in FFT, and only estimate the saturation error. In IFFT, some embodiments select a bit width (to store the operation result) for each stage. The selected bit width is minimized as much as possible while ensuring that the saturation error is less than n. Some embodiments calculate the bit width required for the adjacent stages. If the required bit width growth is faster than expected bit width growth in VLSI design, scaling is performed once after the operation of the stage as late as possible ends. This scaling decision can be expressed as a series of bit sequences with the bit width same as the number of stages. In the bit sequence, 0 represents that scaling is not required and 1 represents that scaling is required. This series of bit sequences will be stored or transmitted with the data itself to direct the operation of subsequent IFFT.

Furthermore, the method proposed by us may be based on a data block. The data block consists of several bit sequences to be transformed. The whole data block shares the same scaling decision. By adjusting the size of the data block, denser and more optimized scale decisions can be obtained, or sparse and more conservative scale decisions can be obtained. For example, in the case where it is more expensive to store or transmit additional bits, increasing the size of the data block reduces the amount of additional data transmission required, and a slightly inferior result is achieved.

FIG. 1 is a schematic flowchart of the overall system. FFT and IFFT are symmetrically distributed in the encoding/sending and decoding/receiving part. There may be other symmetric processing components before or after a critical linear transformation. The scaling information is extracted and processed in the encoding/sending stage. The scaling decision is stored or transmitted with the data itself and used in the decoding/receiving stage.

Figure 2:
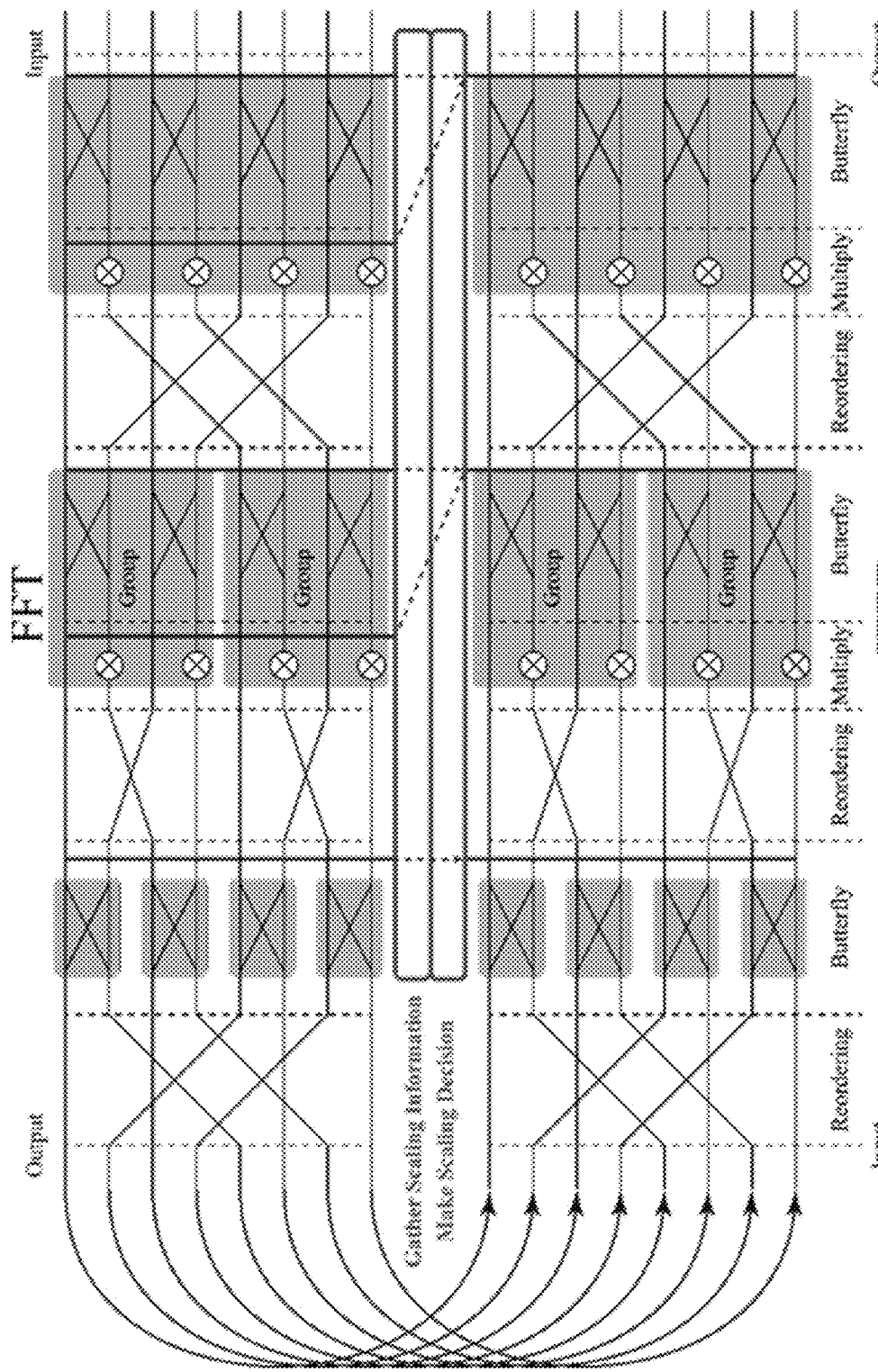
FIG. 2 is a more detailed flowchart, according to example embodiments.

FIG. 2 is a more detailed schematic diagram. It is assumed that we perform FFT first and then perform IFFT, and we choose an IFFT architecture first, as shown in FIG. 2. Then we get a corresponding FFT architecture according to the selected IFFT hardware architecture. In the run process, we collect the scaling information and make a scaling decision at a position where FFT is to be scaled, and then apply it to the corresponding position of IFFT. The data flow direction can be seen from FIG. 2.

An FFT/IFFT operation kernel is described using System Verilog and compiling and testing are performed under the 55 nm standard library by Design Compiler. In addition to being used for ASIC design, some embodiments may equally be applicable to FPGA-based FFT/IFFT hardware implementation.

Figure 3:
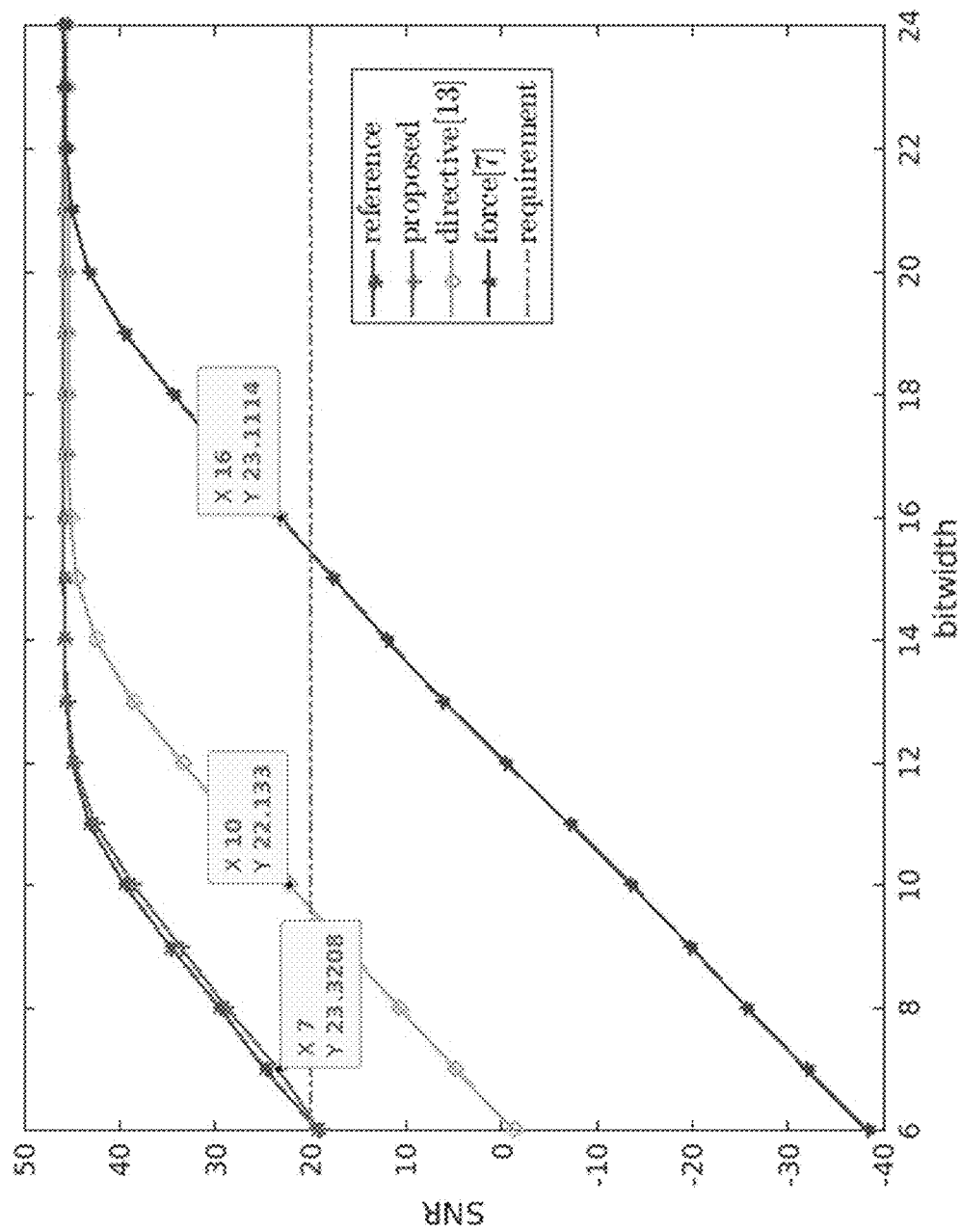
FIG. 3 compares a signal-to-noise ratio with the variation of a bit width for different scaling methods, according to example embodiments.

FIG. 3 compares a signal-to-noise ratio with the variation of a bit width for different scaling methods. The Y coordinate value of the line "requirement" is the minimum signal-to-noise ratio (SNR) requirement of an exact global motion compensation (EGMC) system to ensure acceptable quality. A double-precision line "double" indicates an upper precision limit of the operation performed by using double precision. As can be seen from the figure, in order to achieve the SNR of 20 dB, some methods of the present disclosure may use 7 bits, while the Force and Directive methods may require 10 bits and 16 bits, respectively.

Figure 4:
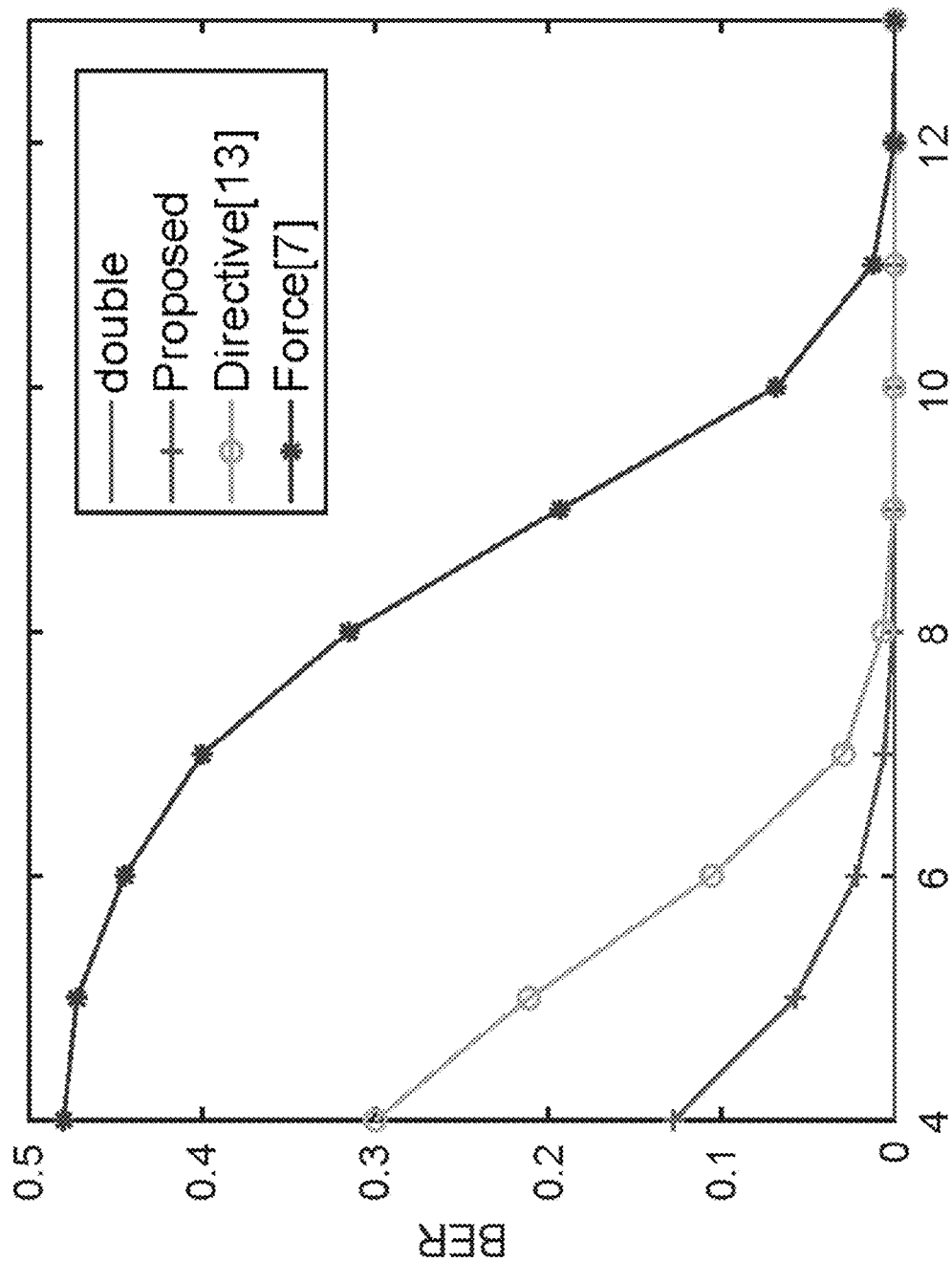
FIG. 4 shows a relationship between the bit width and a final bit error rate (BER) for different scaling methods, according to example embodiments.

FIG. 4 shows a relationship between the bit width and a final BER for different scaling methods. A double-precision line "double" represents an error of the comparison using double precision, which indicates that BER can be as low as 0 under the condition of the selected parameter configuration and channel. Other scaling methods can achieve double-precision reference error results as the bit width used gradually increases. When Directive requires 11 bits and Force requires 13 bits, the SIP method proposed by the present disclosure may first implement BER that can be regarded as 0 at 10 bits. It can be seen that the method proposed by the present disclosure can achieve the lowest bit width under the requirement of the given BER.

What is claimed is:

1. A method for disseminating scaling information in a system, wherein the system simultaneously comprises a linear decomposable transformation process and an inverse process of the linear decomposable transformation process, wherein the inverse process of the linear decomposable transformation process is defined, in time or space, as an inverse linear decomposable transformation process, wherein the linear decomposable transformation process is separated from the inverse linear decomposable transformation process, wherein the linear decomposable transformation process or the inverse linear decomposable transformation process is able to be performed first and is defined as a linear decomposable transformation I, wherein the other remaining process is performed subsequently and is defined as a linear decomposable transformation II, wherein the method for disseminating scaling information is used for a bit width-optimized and energy-saving hardware implementation of linear decomposable transformation in digital signal processing (DSP), and wherein the method for disseminating scaling information comprises:

in a system design stage:
negating an operation at each stage of the linear decomposable transformation II as an operation at a corresponding stage of the linear decomposable transformation I;
designing a bit width for each stage of the linear decomposable transformation II;
inserting a scaling information collection module and a scaling decision-making module in the linear decomposable transformation I; and
inserting a multiplexer in the linear decomposable transformation II; and in a system run stage:
while running the linear decomposable transformation I:
collecting and calculating, by the scaling information collection module, a bit width and saturation cost that is required for each stage of the linear decomposable transformation II; and
determining, by the scaling decision-making module based on the bit width and saturation cost required for each stage, whether scaling is required to obtain a best scaling strategy, wherein determining whether scaling is required to obtain the best scaling strategy comprises:
in response to the bit width required at the current stage being smaller than a pre-designed bit width, determining, by the scaling decision-making module, that scaling is not required at the current stage; and
in response to the bit width required at the current stage being larger than the pre-designed bit width:
determining whether the saturation cost is greater than a fixed value hyperparameter n, wherein the fixed value hyperparameter n comprises a quantization error;
in response to the saturation cost being less than the fixed value hyperparameter n, determining, by the scaling decision-making module, that scaling is not required at the current stage; and
in response to the saturation cost being greater than the fixed value hyperparameter n, determining, by the scaling decision-making module, that scaling is required at the current stage; and
performing, by the multiplexer at each stage when the linear decomposable transformation II runs, a scaling decision, wherein the scaling decision was output by the scaling decision-making module.

2. The method for disseminating scaling information in a system according to claim 1, wherein in the system design stage, when a bit width is designed for each stage of the linear decomposable transformation II, the selected bit width is minimized as much as possible while ensuring that the saturation error is less than n.

3. The method for disseminating scaling information in a system according to claim 1, wherein the scaling decision-making module expresses the scaling decision as a series of bit sequences with a bit width that is the same as the number of stages, and wherein, when the linear decomposable transformation I and the linear decomposable transformation II have M stages in total:

a length of the bit sequence is M; and
a value of the $m^{th}$ bit element in the bit sequence is 0 when scaling is not required and a 1 when scaling is required, wherein m is an integer between 1 and M, inclusive.

4. The method for disseminating scaling information in a system according to claim 3, wherein a data block is composed of a plurality of the bit sequences, wherein the entire data block has the same scaling decision, and wherein, by adjusting the size of the data block:
denser and more optimized scale decisions are obtainable; or
sparse and more conservative scale decisions are obtainable.

5. The method for disseminating scaling information in a system according to claim 1, wherein:
the linear decomposable transformation I is adjacent to the linear decomposable transformation II; or
other symmetric data processing components are inserted between the linear decomposable transformation I and the linear decomposable transformation II.

6. Application of the method for disseminating scaling information in a system according to claim 1 in a very large scale integration (VLSI) implementation of a fixed-point fast Fourier transform (FFT),
wherein, when the linear decomposable transformation process is FFT and the inverse linear decomposable transformation process is inverse fast Fourier transform (IFFT):
the linear decomposable transformation I is FFT or IFFT performed first; and
the linear decomposable transformation II is IFFT or FFT performed later,
wherein, when a bit width is designed for each stage of the linear decomposable transformation II, the bit width is a bit width expected in VLSI design, and
wherein, when the linear decomposable transformation II runs, at each stage, on a VLSI architecture of the linear decomposable transformation II, a scaling decision output by a scaling decision-making module is executed by the multiplexer, so that the scaling decision output by the scaling decision-making module serves fixed-point VLSI implementation of the linear decomposable transformation II.

7. A system, wherein the system simultaneously comprises a linear decomposable transformation process and an inverse process of the linear decomposable transformation process, wherein the inverse process of the linear decomposable transformation process is defined, in time or space, as an inverse linear decomposable transformation process, wherein the linear decomposable transformation process is separated from the inverse linear decomposable transformation process, wherein the linear decomposable transformation process or the inverse linear decomposable transformation process is able to be performed first and is defined as a linear decomposable transformation I, wherein the other remaining process is performed subsequently and is defined as a linear decomposable transformation II, wherein scaling information in the system is configured to be disseminated by a method, wherein the method is used for a bit width-optimized and energy-saving hardware implementation of linear decomposable transformation in digital signal processing (DSP), and wherein the method comprises:

in a system design stage:
negating an operation at each stage of the linear decomposable transformation II as an operation at a corresponding stage of the linear decomposable transformation I;

designing a bit width for each stage of the linear decomposable transformation II;
inserting a scaling information collection module and a scaling decision-making module in the linear decomposable transformation I; and
inserting a multiplexer in the linear decomposable transformation II; and in a system run stage:
while running the linear decomposable transformation I:
collecting and calculating, by the scaling information collection module, a bit width and saturation cost that is required for each stage of the linear decomposable transformation II; and
determining, by the scaling decision-making module based on the bit width and saturation cost required for each stage, whether scaling is required to obtain a best scaling strategy, wherein determining whether scaling is required to obtain the best scaling strategy comprises:
in response to the bit width required at the current stage being smaller than a pre-designed bit width, determining, by the scaling decision-making module, that scaling is not required at the current stage; and
in response to the bit width required at the current stage being larger than the pre-designed bit width:
determining whether the saturation cost is greater than a fixed value hyperparameter n, wherein the fixed value hyperparameter n comprises a quantization error;
in response to the saturation cost being less than the fixed value hyperparameter n, determining, by the scaling decision-making module, that scaling is not required at the current stage; and
in response to the saturation cost being greater than the fixed value hyperparameter n, determining, by the scaling decision-making module, that scaling is required at the current stage; and
performing, by the multiplexer at each stage when the linear decomposable transformation II runs, a scaling decision, wherein the scaling decision was output by the scaling decision-making module.

8. The system according to claim 7, wherein in the system design stage, when a bit width is designed for each stage of the linear decomposable transformation II, the selected bit width is minimized as much as possible while ensuring that the saturation error is less than n.

9. The system according to claim 7, wherein the scaling decision-making module expresses the scaling decision as a series of bit sequences with a bit width that is the same as the number of stages, and wherein, when the linear decomposable transformation I and the linear decomposable transformation II have M stages in total:
a length of the bit sequence is M; and
a value of the $m^{th}$ bit element in the bit sequence is 0 when scaling is not required and a 1 when scaling is required, wherein m is an integer between 1 and M, inclusive.

10. The system according to claim 9, wherein a data block is composed of a plurality of the bit sequences, wherein the entire data block has the same scaling decision, and wherein, by adjusting the size of the data block:
denser and more optimized scale decisions are obtainable; or
sparse and more conservative scale decisions are obtainable.

11. The system according to claim 7, wherein:
the linear decomposable transformation I is adjacent to the linear decomposable transformation II; or
other symmetric data processing components are inserted between the linear decomposable transformation I and the linear decomposable transformation II.

12. The system according to claim 7, wherein the system is a very large scale integration (VLSI) implementation of a fixed-point fast Fourier transform (FFT),
wherein, when the linear decomposable transformation process is FFT and the inverse linear decomposable transformation process is inverse fast Fourier transform (IFFT):
the linear decomposable transformation I is FFT or IFFT performed first; and
the linear decomposable transformation II is IFFT or FFT performed later,
wherein, when a bit width is designed for each stage of the linear decomposable transformation II, the bit width is a bit width expected in VLSI design, and
wherein, when the linear decomposable transformation II runs, at each stage, on a VLSI architecture of the linear decomposable transformation II, a scaling decision output by a scaling decision-making module is executed by the multiplexer, so that the scaling decision output by the scaling decision-making module serves fixed-point VLSI implementation of the linear decomposable transformation II.

* * * * *